May 29, 1923.                               1,456,967
C. C. BIELITZ
SIGNAL FOR AUTOMOBILES
Filed Oct. 22, 1921          2 Sheets-Sheet 2
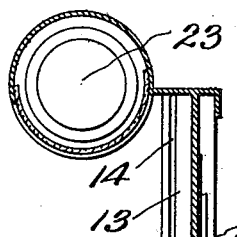
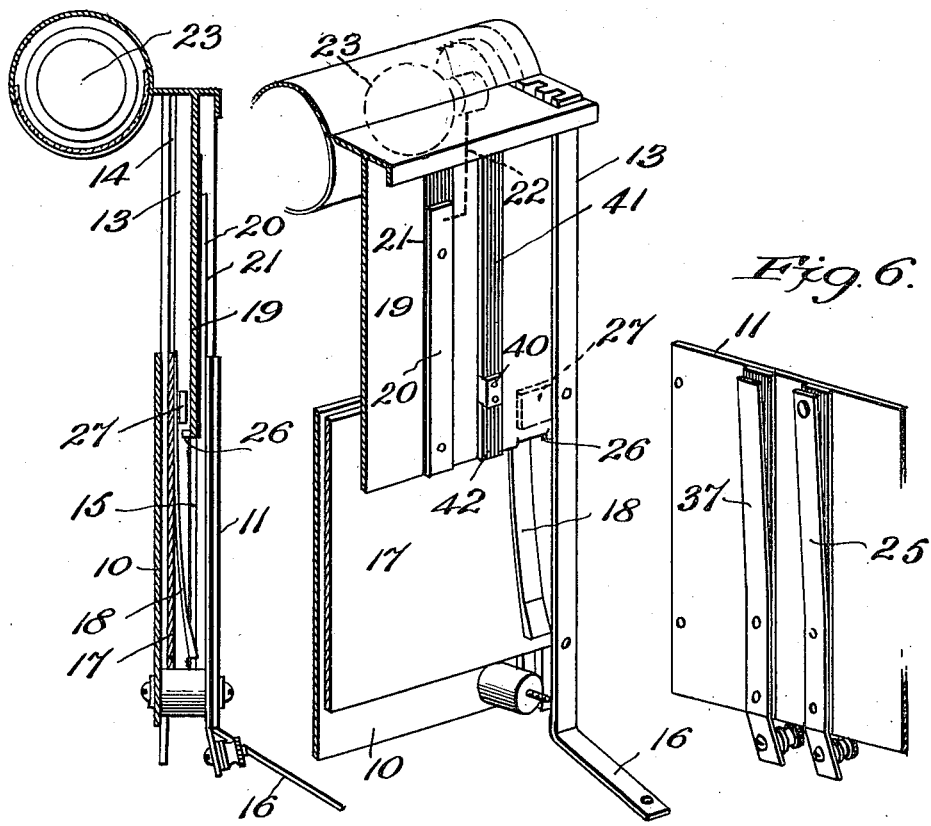
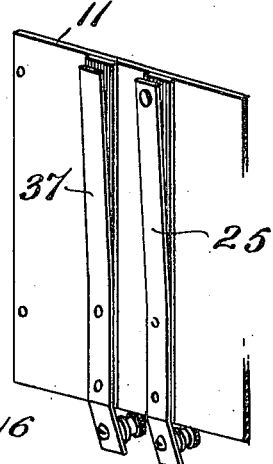
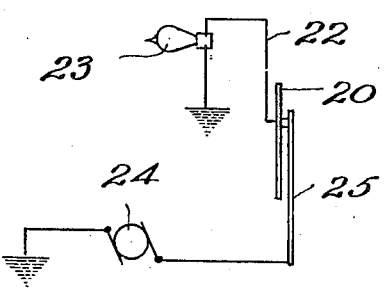
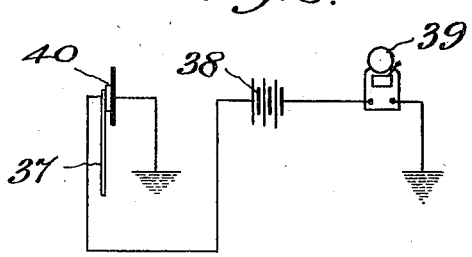
Charles C. Bielitz
Inventor
By his Attorney Patented May 29, 1923.

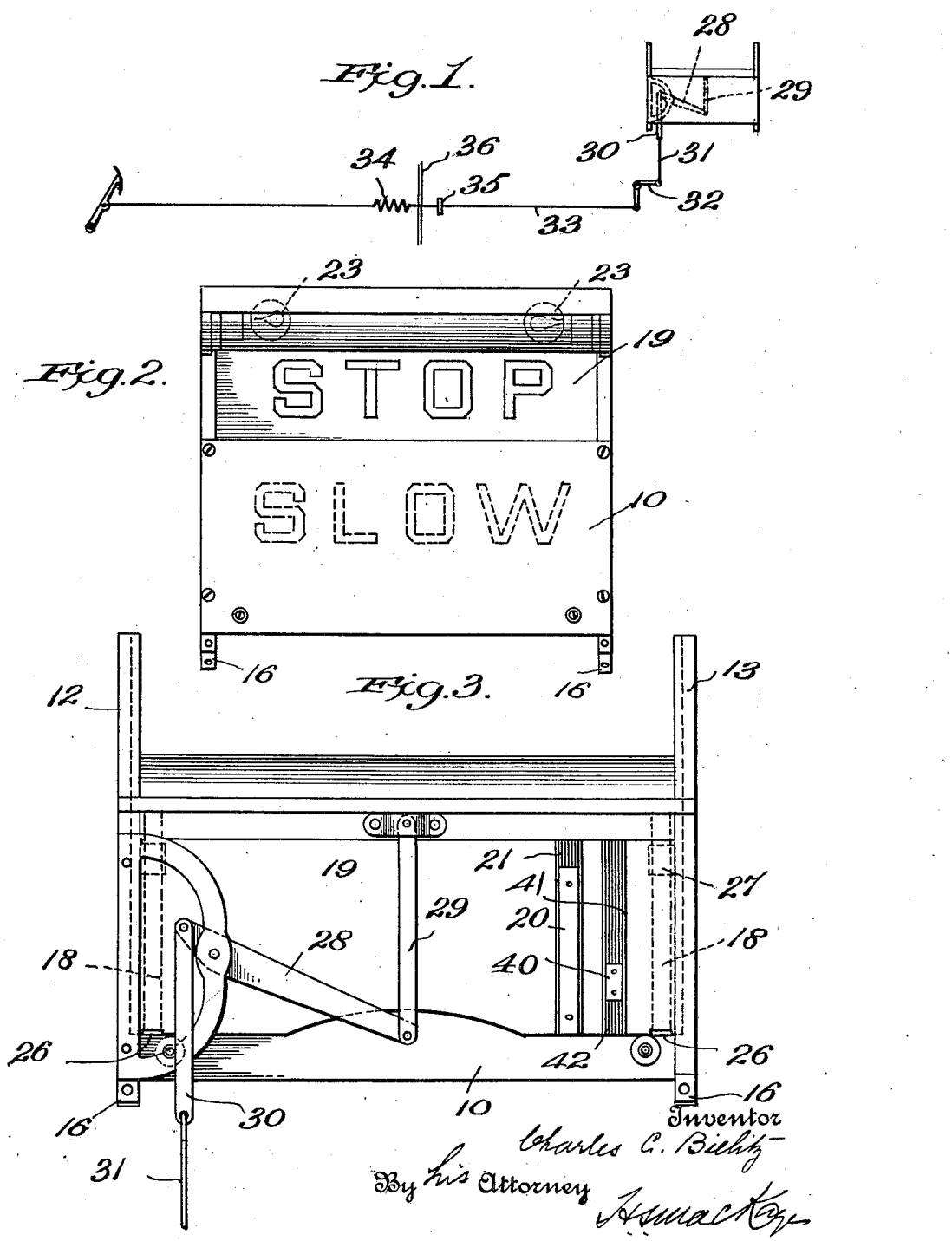

1,456,967

UNITED STATES PATENT OFFICE.

CHARLES C. BIELITZ, OF BROOKLYN, NEW YORK.

SIGNAL FOR AUTOMOBILES.

Application filed October 22, 1921. Serial No. 509,639.

*To all whom it may concern:*

Be it known that I, CHARLES C. BIELITZ, a citizen of the Republic of Germany, residing in Brooklyn, county of Kings, State of New York, have invented a certain Improvement in Signals for Automobiles, of which the following is a specification.

The present invention has relation to an improved signal intended to be placed behind an automobile and adapted to exhibit a warning automatically when the usual brake is applied. This signal shows the word "Slow" or its equivalent when the car is being slowed and the word "Stop" when final brake pressure is applied. It is also preferably associated with a bell or other audible signal which operates automatically and serves both to inform the driver of the car of the position which the signal device occupies and to warn any following car driver.

The invention is illustrated in a preferred form in the accompanying drawings wherein Figure 1 is a diagram showing the relation of the signal to the brake lever, Figure 2 is an elevation of the signal as seen from the rear of the car, when the brake is hard on, Figure 3 is an elevation of the signal mechanism seen from behind, with the rear cover plate removed, Figure 4 is a vertical sectional view of the signal mechanism, Figure 5 is a perspective view of part of the same seen from behind, showing the parts in the "Stop" position, Figure 6 is a perspective view of a part of the back cover plate, showing its inner face, and Figures 7 and 8 are diagrams of electric circuits as preferably used on my device.

The framework of the signal device proper comprises preferably a front plate 10 and a back plate 11 separated by side pieces 12 and 13, each of which latter is provided with internal slots or guideways 14 and 15. The brackets 16 are for support of the whole at the back of the car, but any mode of support may be used.

Two signal plates are arranged to slide up and down between the plates 10 and 11. The forward one of these, shown at 17, slides in the slots 14 and is provided on its rear face with spring plates 18, tending to bend backward at their lower ends. This plate has the word "Slow" on its front face and is normally concealed behind the plate 10.

The rearward signal plate 19 slides in the slots 15 and is preferably provided on its rear face with two metallic contact pieces which are useful in connection with the electric circuits preferably used. The first of these, shown at 20, is mounted upon insulation 21 and is connected by a wire 22 with lamps 23, the opposite terminals of which are grounded. The generator 24, grounded on one side is connected by a long spring terminal 25, mounted on insulation inside of the back plate 11, which bears on the strip 20 and so closes the circuit. The strip 20 is preferably cut off at its upper end so that no contact exists when the plate 19 is in its normal position. By this arrangement the lamps 23 are only lighted as the signal is raised.

These lamps are mounted at the top of the plate 19, as shown, and serve to illuminate the word "Stop" and the word "Slow" when shown.

At the bottom of the plate 19 are shallow ledges 26 which normally act upon the ends of the spring plates 18 to lift the forward signal plate 17 when the rear plates rises.

If, now, the rear plate 19 is lifted by any means, it carries the forward plate 17 with it, and the word "Slow" is first displayed above the front plate 10. When the two plates have been lifted to a predetermined height, however, the backwardly bent ends of the spring plates 18 are pressed down close to the plate 17 by the projections 27 at each side. This removes the tips of these spring plates from the ledges 26, and the plate 17 drops, thus exposing the rearward plate 19, showing the word "Stop." Further movement of the plate 19 is accomplished without the plate 17.

These operations are preferably accomplished automatically in connection with the brake ordinarily used upon a car. Any convenient mode of connection may be employed, and in the drawing there is shown for this purpose a pivoted lever 28, just inside of the back plate which is connected with the plate 19 by means of a bar 29. A pivoted bar 30 is connected at one end with the lever 28 and at the other by a wire 31 to a bell crank 32. This bell crank is connected through a rod 33 and stiff spiral spring 34 with the usual brake pedal lever. To prevent interference with operation of the brake after the signal is in the fully raised position, a stop 35 and a fixed abutment 36 are provided, so that as soon as these come in contact, further movement of the brake lever merely extends the spring 34.

Where an audible signal is desired, the back plate 11 is provided with a second insulated spring contact 37. connected permanently with a battery 38 and bell 39, grounded on the opposite side. On the back of the plate 19 is a short metal contact 40 which is permanently connected with ground through the plate 19, and only makes contact with the spring 37 when the plate 19 reaches a point at which the forward plate 17 is about to be released. Above and below this point no contact is made, as preferably arranged; although it would, of course, be within the invention to prolong the audible signal by suitably altering this arrangement. In any case, it will be understood that, when the bell is not ringing, the spring 37 rests against insulation 41 or 42.

When the brake is finally released, the plate 19 falls back behind the plate 10 and the springs 18 again engage the ledges 26, preparatory to repetition of the operation above set forth.

Various changes may be made in the structure and arrangement of this device without departing from the scope of the invention, and I do not limit myself to the details herein shown and described.

What I claim is—

1. A signal for the purpose described comprising two parallel slidable plates, means for raising one of them, a temporary connection between said plates adapted to cause one to lift the other and means adapted to come into play when both plates are partly raised for disestablishing said temporary connection.

2. Means as in claim 1 wherein one plate is provided with a spring strip normally engaging the other plate and wherein a projection lying over said strip is adapted to remove it from said engagement when the two plates are raised.

3. Means as in claim 1 in combination with the brake mechanism of an automobile and operative connections between said mechanism and the lifting means for the slidable plates.

4. A signal device comprising a movable sign-bearing plate, a movable cover plate for concealing the same, a connection between the two, means for moving one of said plates, and means for rendering the connection inoperative to permit separation of the plates after partial movement of the plate directly actuated by the moving means.

In testimony whereof I have hereto set my hand on this 20th day of October, 1921.

CHAS. C. BIELITZ.